United States Patent
Duan et al.

(10) Patent No.: US 9,149,950 B2
(45) Date of Patent: Oct. 6, 2015

(54) DEBRIS COLLECTION DEVICE FOR CUTTING MECHANISM AND LCD PANEL CUTTING DEBRIS SUCTION DEVICE

(75) Inventors: Huifang Duan, Shenzhen (CN); Shaoyuan Zhang, Shenzhen (CN); Hao Jin, Shenzhen (CN); Rui Xu, Shenzhen (CN); Junjie Huang, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 508 days.

(21) Appl. No.: 13/376,187

(22) PCT Filed: Nov. 3, 2011

(86) PCT No.: PCT/CN2011/081748
§ 371 (c)(1),
(2), (4) Date: Dec. 4, 2011

(87) PCT Pub. No.: WO2013/060041
PCT Pub. Date: May 2, 2013

(65) Prior Publication Data
US 2013/0104336 A1 May 2, 2013

(30) Foreign Application Priority Data
Oct. 28, 2011 (CN) .......................... 2011 1 0333473

(51) Int. Cl.
*A47L 9/02* (2006.01)
*B26D 7/18* (2006.01)
(Continued)

(52) U.S. Cl.
CPC ............... *B26D 7/1863* (2013.01); *B28D 7/02* (2013.01); *G02F 1/1303* (2013.01)

(58) Field of Classification Search
CPC ........ B24B 55/06; B24B 55/08; B24B 55/10; B24B 55/102; B24B 55/105; B24B 55/107
USPC .......... 15/339, 415.1; 451/456, 451; 144/240, 144/250.12
See application file for complete search history.

(56) References Cited

U.S. PATENT DOCUMENTS 3,837,383 A * 9/1974 Ko .............................. 144/251.2
4,200,417 A * 4/1980 Hager et al. .................... 408/67
(Continued)

FOREIGN PATENT DOCUMENTS

CN 1381748 A 11/2002
CN 2658216 Y 11/2004
(Continued)

OTHER PUBLICATIONS

Li Hui, the International Searching Authority written comments, Jul. 2012, CN.

*Primary Examiner* — Dung Van Nguyen
(74) *Attorney, Agent, or Firm* — IPro, Inc.; Na Xu

(57) ABSTRACT

The present invention discloses a debris collection device for cutting mechanism and an LCD panel cutting debris suction device. A debris collection device for cutting mechanism comprises a debris collection cap and a suction spray head used for connecting with a suction device; the debris collection cap comprises a connecting part used for surrounding and fixing on the cutting mechanism, and the debris collection cap is provided with a through hole communicated with the suction spray head. The present invention can remove the debris produced in the cutting process in time, and can reduce relevant defects such as line scratches, terminal scratches, short circuit, broken circuit, etc. which are generated because of debris. Thus, the product yield and quality of LCD panels can be improved, and the time of the subsequent cleaning process can be reduced.

11 Claims, 5 Drawing Sheets

(51) Int. Cl.
  *B28D 7/02* (2006.01)
  *G02F 1/13* (2006.01)

(56) References Cited

U.S. PATENT DOCUMENTS

| | | | | |
|---|---|---|---|---|
| 5,034,041 | A | * | 7/1991 | Austin ............... 55/385.1 |
| 5,220,753 | A | * | 6/1993 | Whitman ............ 451/456 |
| 5,632,579 | A | * | 5/1997 | Susnjara ............. 409/137 |
| 5,904,453 | A | * | 5/1999 | Gavia ................... 408/67 |
| 5,988,954 | A | * | 11/1999 | Gaskin et al. ......... 408/67 |
| 6,079,078 | A | * | 6/2000 | Byington ............... 15/339 |
| 6,830,113 | B2 | * | 12/2004 | Moore et al. .......... 173/198 |

FOREIGN PATENT DOCUMENTS

| | | |
|---|---|---|
| CN | 1945795 A | 4/2007 |
| CN | 201241007 Y | 5/2009 |
| JP | 2003292331 A | 10/2003 |
| JP | 2006-089325 A | 4/2006 |
| JP | 2008-119698 A | 5/2008 |
| KR | 100710854 B1 | 4/2007 |

\* cited by examiner

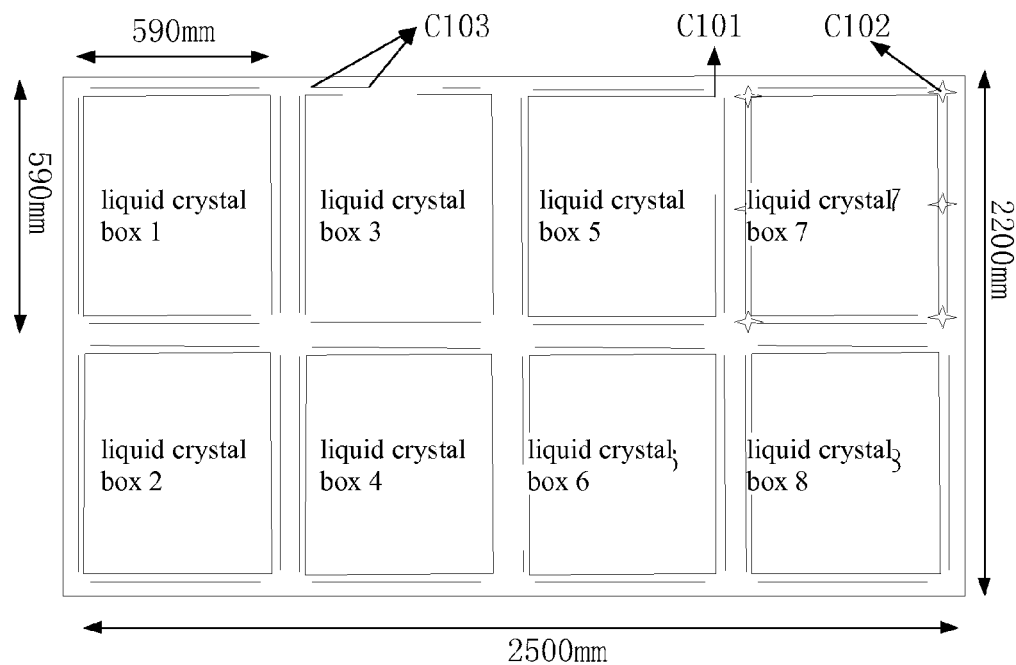
Figure 1 <Prior Art>
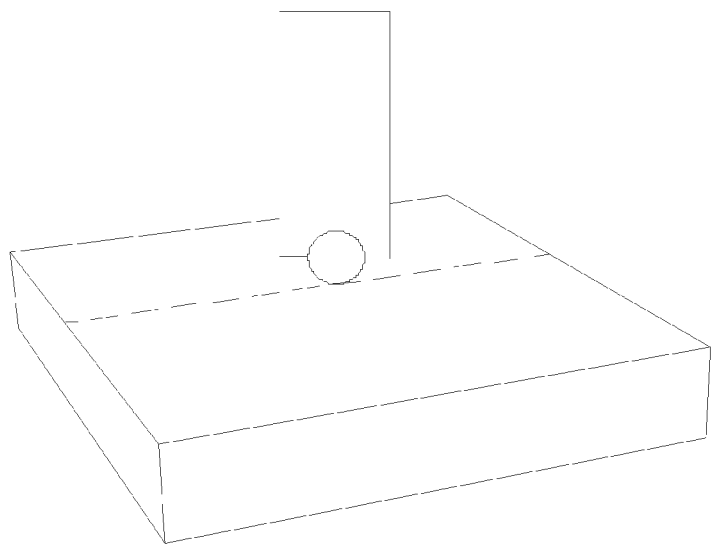
Figure 2 <Prior Art>

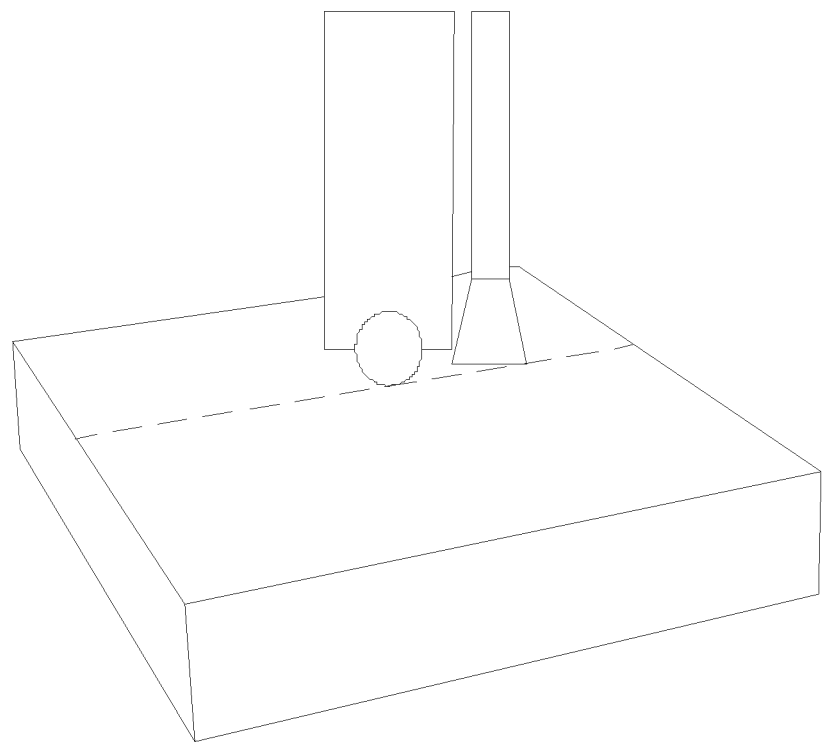
Figure 3  <Prior Art>

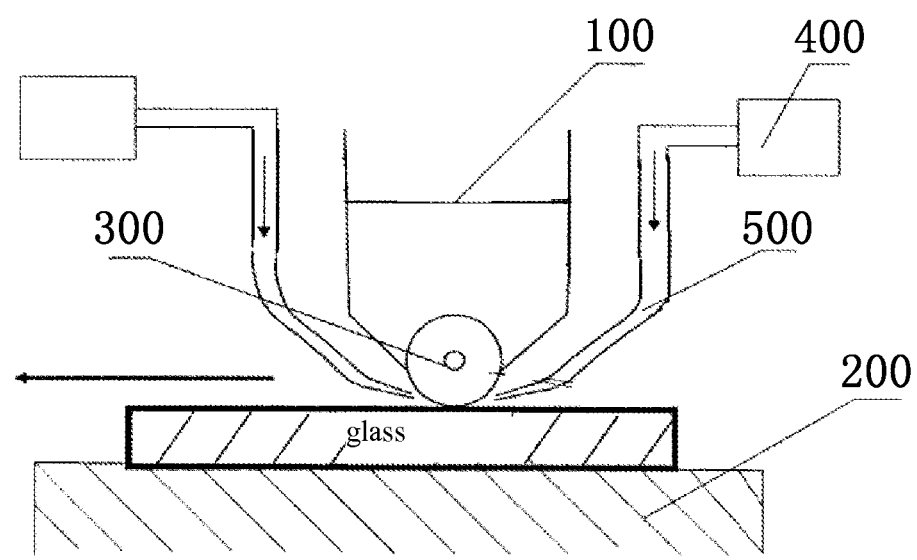
Figure 4 <Prior Art>

DEBRIS COLLECTION DEVICE FOR CUTTING MECHANISM AND LCD PANEL CUTTING DEBRIS SUCTION DEVICE

TECHNICAL FIELD

The present invention relates to the field of liquid crystal displays (LCDs), and more particularly to a debris collection device for cutting mechanism and an LCD panel cutting debris suction device.

BACKGROUND

Thin film transistor liquid crystal display (TFT LCD) has already become a crucial display platform of modern IT and video products. The main operating principle of the TFT LCD is as follows: appropriate voltage is applied between the liquid crystal layers formed by bonding an array glass substrate to a color filter (CF) glass substrate, so that liquid crystal molecules are deflected under the action of the voltage, and different penetration rates are obtained by the control of different voltages. Thus, display is achieved. The array glass substrate is bonded to the CF glass substrate by frame adhesive, and an electrical signal at the CF end is connected with the line at the array end by gilded Au-Ball(s) with the radius of micron order.

As show FIG. 1, an eighth-generation LCD substrate (2200 mm*2500 mm) is cut into eight panels of 47 inch (1040 mm*59 mm), and LCD panels C101, C102, C103 of different sizes are formed through cutting after the array glass substrate is bonded to the CF glass substrate. The substrate is cut in the rear section for forming boxes in accordance with set size. Glass debris is generated in the cutting process, and the debris is required to be cleaned in the production process to avoid affecting subsequent processes and product yield.

As shown in FIG. 2, FIG. 2 is a structure diagram of a glass cutting machine in the CELL process. The existing glass cutting machine does not do any treatment in the cutting process, so that the corresponding glass debris is kept and is cleaned in the next station. The treating mode causes the following results:

1. The subsequent cleaning time is increased, and the productivity increase is affected;

2. The problems of line scratches, terminal scratches, short circuit, broken circuit, etc. of an LCD panel are caused by glass debris;

3, The lung of a person is injured when glass debris is inhaled by the person, and lung cancer is caused if the glass debris is inhaled for a long time;

4. Bad products are easily caused if foreign matter such as glass debris, etc. fall into workpieces; and 5. The machine is easily seized or is rapidly worn if foreign matter such as glass debris, etc. falls into workbench.

To solve the problem of glass debris, the prior art provides a technical scheme as shown in FIG. 3. The technical scheme is as follows: a sucking disk is arranged behind the traveling direction of a cutting wheel to adsorb the generated glass debris, and then glass debris is adsorbed in the cutting process in time. However, because glass debris is dispersed around the cutting wheel, the technical scheme can only adsorb partial glass debris behind the traveling direction of the cutting wheel, but cannot adsorb glass debris in other directions.

As shown in FIG. 4, a Chinese patent CN201241007Y discloses an LCD debris collection device. The glass cutting machine comprises a cutting mechanism 100, a positioning mechanism 200 and a cutting wheel 300. The cutting wheel 300 is arranged on the head part of the cutting mechanism 100 and is fixed on the cutting mechanism 100 by bolts and the like, and glass is levelly cut by the cutting wheel 300 at high speed. The positioning mechanism 200 is positioned under the cutting wheel 300, and is used as a workbench for fixing the glass to be cut.

The core of the technical scheme is that the glass cutting machine also comprises an injection device, and the injection device comprises an injection source mechanism 400 and a number of discharge pipes 500. The discharge pipes 500 are made of plastic or metal, and are arranged around the cutting mechanism 100; one end of each discharge pipe 500 is connected to the injection source mechanism, and the other end is connected to a suction spray head. The suction spray head is just aligned with the position of the cut glass, and can spray water or mist into the discharge pipes 500. Therefore, when cutting glass, the cutting wheel 300 can achieve the effect of cleaning foreign matter in the cutting path by spraying water or mist to the cutting position; and more importantly, the sprayed water or mist can prevent glass debris from flying to damage the workbench, products and human bodies. The technical scheme can prevent the damages caused by flying glass debris. However, spraying water or mist can only flush the glass debris from the machining area of the cutting wheel, and the glass debris flows with the water flow and falls on the glass surface. Thus, the problems of line scratches, terminal scratches, short circuit, broken circuit, etc. of the LCD panel are still caused. In addition, the machined LCD panel is still required to be further cleaned, and then the productivity increase is affected.

SUMMARY

The aim of the present invention is to provide a debris collection device for cutting mechanism capable of efficiently collecting debris, and an LCD panel cutting debris suction device.

The purpose of the present invention is achieved by the following technical schemes.

A debris collection device for cutting mechanism comprises a debris collection cap and a suction spray head used for connecting with a suction device; the debris collection cap comprises a connecting part used for surrounding and fixing on the cutting mechanism and the debris collection cap is provided with a through hole communicated with the suction spray head.

Preferably, the debris collection device for cutting mechanism also comprises a debris adsorption tube for adsorbing debris, and the suction spray head is connected with the suction device through the debris adsorption tube. Because of space limitation, the debris collection cap is short and small; and the time of airflow passing through the debris collection cap is short; the effect of the debris collection is limited; because the debris adsorption tube is thin and long, and there is sufficient time for airflow to separate from debris in the adsorption tube, the debris collection capacity of the debris collection cap is further increased. Preferably, the cutting mechanism also comprises a blow pipe, and the gas spray head is connected with the suction device through the blow pipe. The gas spray head is connected by the blow pipe and then is made to be short and small, and the mobility of the device is increased.

Preferably, the debris adsorption tube also comprises a separator for separating debris from airflow. The separation and collection of debris are conveniently performed in the debris adsorption tube by the separator; debris entering the suction device is effectively reduced, and the performance of the suction device is efficiently improved.

Preferably, the separator comprises an inflated separation cavity connected with the suction spray head, and a concave debris collection bin positioned below the separation cavity. The airflow speed of the suction spray head is high, and the inflated separation cavity enables the airflow with debris to slow down in the cavity. Thus, the debris is separated from the airflow under the action of gravity, and then falls into the concave debris collection bin below the separation cavity to be collected together.

Preferably, the debris collection bin is removably arranged on the separation cavity. Thus, the debris collection bin is conveniently removed to clean the debris accumulated in a collector without removing other components, and the working efficiency is increased.

Preferably, the debris collection device for cutting mechanism also comprises a fixing device for fixing the cutting mechanism, and the fixing device comprises a fixer for fixing the debris adsorption tube. The cutting mechanism, the suction spray head and the debris collection cap are simultaneously fixed by the fixing device so that the three equipments can move simultaneously, and the difficulty of operation is simplified.

Preferably, the fixer can be horizontally moved on the fixing device, and the length of the fixer can be adjusted. The technical scheme can adjust the relative height and the relative distance between the suction spray head and the cutting mechanism so as to adjust the collection effect.

Preferably, the suction device comprises a speed adjuster for regulating airflow speed. The technical scheme can regulate the suction airflow in accordance with the field use situation so as to achieve the preferable debris suction effect.

Preferably, the cutting mechanism comprises a cutting wheel; the connecting part of the debris collection cap is fixed above the cutting wheel; and the position of the opening of the debris collection cap is higher than the position of the lower edge of the cutting wheel. Using the cutting wheel to cut is a specific form of the cutting mechanism, and is used in the LCD cutting field. The horizontal position of the debris collection cap is higher than the position of the lower edge of the cutting wheel, so that scratches caused by direct contact between the debris collection cap and the workpiece surface can be avoided.

Preferably, the debris collection cap is made of non-conductive material. Conductive material such as metal, conductive plastic and the like are not used for cutting electronic products; this avoids the risk of wire short circuit because of additional friction-produced and collision-produced metal debris remaining on the workpiece surface.

Preferably, groove(s) is arranged in the debris collection cap. The groove can prevent the collected debris from falling onto the workpiece surface again because of self-weight and collision.

Preferably, the connecting part of the debris collection cap is provided with a regulator used for regulating fixed position on the cutting mechanism. Thus, the height of the debris collection cap is regulated in accordance with factors such as airflow, size of the cutting mechanism, cutting speed, etc., so as to achieve the preferable debris collection effect.

Preferably, the debris collection cap is in airtight connection with the cutting mechanism and the suction spray head. After airtight connection, a airtight space is formed between the suction opening of the debris collection cap and the connecting part, and the external airflow enters the debris collection cap only by the suction opening. Thus, more debris is prompted to enter the debris collection cap, and the debris collection capacity is further improved.

Preferably, the debris collection device for cutting mechanism comprises multiple debris collection caps of different sizes, and the debris collection caps are replaceable in accordance with the movement limitation of the cutting mechanism or the space of the original cutting workbench, and the application range of the device is expanded.

Preferably, the opening of the debris collection cap is in a circular shape. This is a specific structure of the debris collection cap. Because the suction airflow generated around the circular suction opening is uniform, the phenomenon that debris cannot be collected because of oversmall airflow of partial areas is avoided.

An LCD panel cutting debris suction device comprises a debris collection cap and a suction spray head used for connecting with a suction device; the debris collection cap comprises a connecting part used for surrounding and fixing above the cutting wheel of the cutting mechanism, and the debris collection cap is provided with a through hole communicated with the suction spray head.

A debris collection cap is used in the present invention, the connecting part of the debris collection cap is surrounded and fixed on the cutting mechanism, and the suction opening of the debris collection cap is close to the surface of a workpiece to be cut. Thus, a narrow space which is almost fully closed is formed between the cutting mechanism and the workpiece, and then the side wall of the debris collection cap is connected with the suction spray head. Suction airflow is produced when the suction spray head operates, and the airflow enters the collection cap through the suction opening of the collection cap along the periphery of the cutting mechanism and then enters the suction spray head. Because the capacity of the semi-airtight narrow space for weakening airflow is limited, all the debris falling around the cutting mechanism is sucked in the collection cap 14 in the cutting process of the cutting mechanism as long as the airflow speed is appropriate, and the debris around the cutting mechanism in every direction is efficiently recovered. Obviously, the present invention can remove the debris produced in the cutting process in time, and can reduce relevant defects such as line scratches, terminal scratches, short circuit, broken circuit, etc. which are generated because of debris. Thus, the product yield and quality can be improved, and the time of the subsequent cleaning process can be reduced.

BRIEF DESCRIPTION OF FIGURES

FIG. 1 is a schematic diagram of an LCD substrate;

FIG. 2 is a schematic diagram of one existing LCD panel cutting debris collection device;

FIG. 3 is a schematic diagram of the other existing LCD panel cutting debris collection device;

FIG. 4 is a schematic diagram of an LCD panel cutting debris suction device of a contrast document;

Wherein: 1. suction spray head; 14. collection cap; 15. through hole; 16. connecting part; 17. side wall; 18. opening; 2. cutting mechanism; 21. cutting wheel; 22. cutting wheel fixing device; 3. fixing device; 31. fixer; 4. debris adsorption tube; 5. separator; 51. debris collection bin; 52. separation cavity.

DETAILED DESCRIPTION

The present invention will further be described in detail in accordance with the figures and the preferred examples.

A debris collection device for cutting mechanism comprises a debris collection cap and a suction spray head used for connecting with a suction device; the debris collection cap comprises a connecting part used for surrounding and fixing on the cutting mechanism, and the debris collection cap is provided with a through hole communicated with the suction spray head 1. The invention will further be described in detail by using an LCD panel cutting debris suction device as an example.

Figure 5:
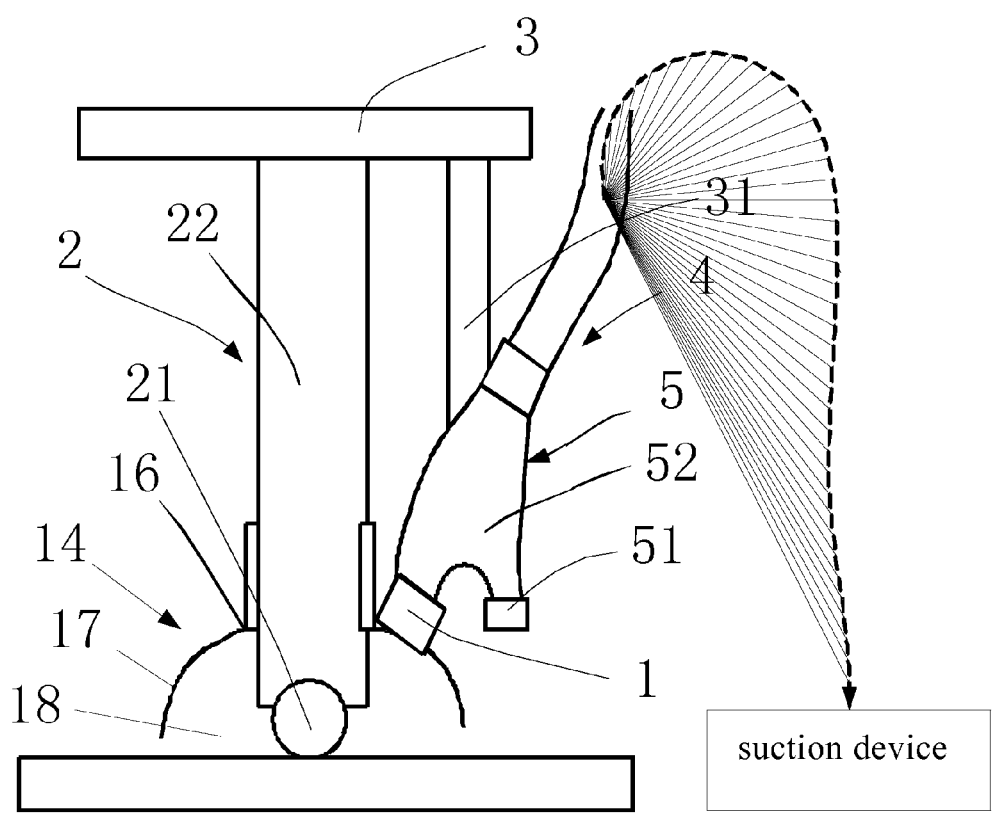
FIG. 5 is a schematic diagram of a debris collection device for cutting mechanism of the present invention.
Figure 6:
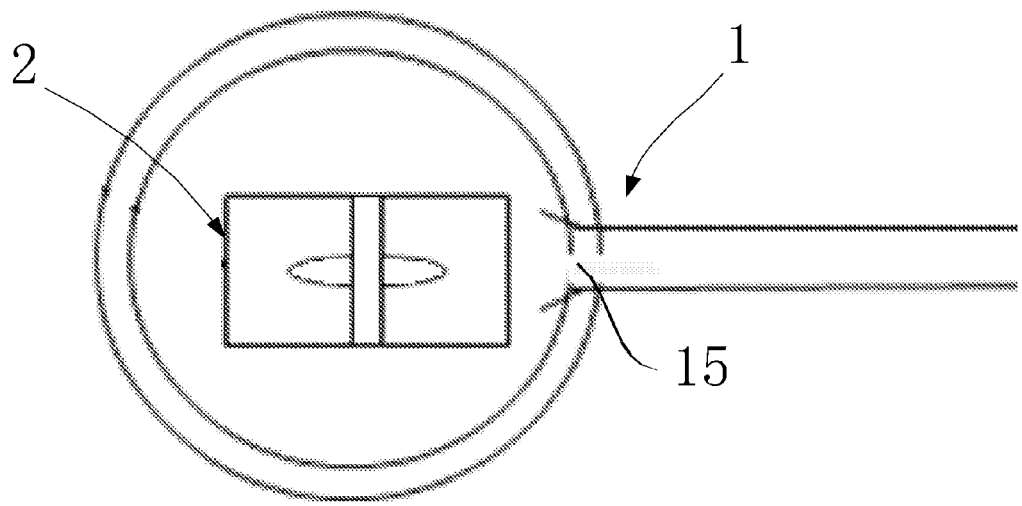
FIG. 6 is a top view of a debris collection device for cutting mechanism of the present invention.

As shown in FIG. 5, an LCD panel cutting debris suction device comprises a debris collection cap 14 and a suction spray head 1 used for connecting with a suction device; the debris collection cap 14 comprises a connecting part 16 used for surrounding and fixing above a cutting wheel 21 of the cutting mechanism, and the debris collection cap 14 is provided with a through hole 15 communicated with the suction spray head 1.

The cutting mechanism 2 comprises a cutting wheel 21 and a cutting wheel fixing device 22 for fixing the cutting wheel 21; a collection cap 14 is fixed above the cutting wheel 21, and there are multiple collection caps 14 of different sizes for replacement; a connecting part 16 of the collection cap 14 is movably surrounded and fixed on the cutting wheel fixing device 22, namely the height of the collection cap 14 is adjustable; the circular suction opening of the collection cap 14 faces and is close to a machined workpiece, but the horizontal position of the debris collection cap 14 is higher than the position of the lower edge of the cutting wheel 21; a side wall is formed between the circular suction opening of the collection cap 14 and the connecting part 16, and the side wall is provided with a through hole 15; the collection cap is also provided with groove(s) for preventing the debris from falling onto the workpiece surface again; the collection cap 14 is made of non-conductive material.

One side of the cutting wheel 21 is provided with a suction spray head 1; the suction spray head 1 is connected with the through hole 15 of the collection cap 14, and the other end is connected to the suction device by a debris adsorption tube 4 capable of adsorbing debris; the debris adsorption tube 4 comprises a separator 5 for separating debris from airflow, and the separator comprises an inflated separation cavity 52 connected with the suction spray head 1, and a concave debris collecting bin 51 which is positioned below the separation cavity 52 and can be removed from the suction device. The suction device comprises a speed adjuster used for regulating airflow speed (not shown in the figure).

The debris collection device for cutting mechanism 2 also comprises a fixing device 3 used for fixing the cutting mechanism 2, and the fixing device 3 comprises a fixer 31 used for fixing the suction spray head 1; the fixer 31 can be horizontally moved on the fixing device 3, and the length of the fixer 31 can be adjusted.

During operation, the cut mechanism is fixed on the fixing device 3; a collection cap 14 of appropriate size is selected; the collection cap 14 is fixed on the cutting wheel fixing device 22 after the height between the collection cap 14 and a workpiece is adjusted; and more preferably, the periphery of the fixing position is sealed to ensure air tightness; the suction spray head 1 is fixed on the fixer 31; the fixer 31 is adjusted; the suction spray head 1 is aligned with the through hole 15 of the collection cap 14; and more preferably, the suction spray head 1 is inserted in the through hole 15, and sealing operation is performed; the debris adsorption tube 4 is installed, and the suction spray head 1 is connected to the suction device. After all the components are connected, cutting operation is performed and the suction device is started; suction airflow is produced; the airflow enters the collection cap 14 through the suction opening of the collection cap 14 along the periphery of the cutting mechanism 2 and then enters the suction spray head 1. Because a semi-airtight narrow space is formed by the collection cap 14 and the surrounding cutting mechanism 2, the capacity for weakening the suction airflow of the suction spray head 1 is limited; all the debris falling around the cutting mechanism 2 is sucked in the collection cap 14 in the cutting process of the cutting mechanism 2 as long as the airflow speed is appropriate, and the debris around the cutting mechanism 2 in every direction is efficiently recovered. Obviously, the present invention can remove the debris produced in the cutting process in time, and can reduce relevant defects such as line scratches, terminal scratches, short circuit, broken circuit, etc. which are generated because of debris. Thus, the product yield and quality can be improved, and the time of the subsequent cleaning process can be reduced.

The present invention is described in detail in accordance with the above contents with the specific preferred embodiments. However, this invention is not limited to the cutting mode of the cutting wheel 21, and is also applicable to the cutting mode of directly using cutter heads (alloy cutter heads, diamond cutter heads and the like). The present invention is applicable to the field of LCD cutting and other occasions on which debris is produced in the cutting process as well. For the ordinary technical personnel of the technical field of the present invention, on the premise of keeping the conception of the present invention, the technical personnel can also make simple deductions or replacements, and all of which should be considered to belong to the protection scope of the present invention.

We claim:

1. A debris collection device for cutting mechanism, comprising: a debris collection cap and a suction spray head used for connecting with a suction device; said debris collection cap comprises a connecting part used for surrounding and fixing on said cutting mechanism, and said debris collection cap is provided with a through hole communicated with said suction spray head,
   wherein said debris collection device for cutting mechanism also comprises a debris adsorption tube capable of adsorbing debris, and said suction spray head is connected with said suction device through said debris adsorption tube,
   wherein said debris collection device for cutting mechanism also comprises a fixing device for fixing the cutting mechanism, and said fixing device comprises a fixer for fixing said debris adsorption tube.

2. The debris collection device for cutting mechanism of claim 1, wherein said fixer can be horizontally moved on said fixing device, and the length of said fixer can be adjusted.

3. The debris collection device for cutting mechanism of claim 1, wherein said cutting mechanism comprises a cutting wheel; the connecting part of said debris collection cap is fixed above said cutting wheel, and the position of the suction opening of said debris collection cap is higher than the position of the lower edge of said cutting wheel.

4. The debris collection device for cutting mechanism of claim 1, wherein said debris collection cap is made of non-conductive material.

5. The debris collection device for cutting mechanism of claim 1, wherein the connecting part of said debris collection cap is provided with a regulator used for regulating fixed position on said cutting mechanism.

6. The debris collection device for cutting mechanism of claim 1, wherein said debris collection cap is airtightlly connected with said cutting mechanism and said suction spray head.

7. The debris collection device for cutting mechanism of claim 1, wherein said debris collection device for cutting mechanism comprises multiple debris collection caps of different sizes.

8. The debris collection device for cutting mechanism of claim 1, wherein the opening of said debris collection cap is in a circular shape.

9. A debris collection device for cutting mechanism, comprising: a debris collection cap and a suction spray head used for connecting with a suction device; said debris collection cap comprises a connecting part used for surrounding and fixing on said cutting mechanism, and said debris collection cap is provided with a through hole communicated with said suction spray head, wherein said debris collection device for cutting mechanism also comprises a debris adsorption tube capable of adsorbing debris, and said suction spray head is connected with said suction device through said debris adsorption tube, wherein said debris adsorption tube also comprises a separator for separating debris from airflow, wherein said separator comprises an inflated separation cavity connected with said suction spray head, and a concave debris collection bin positioned below the separation cavity.

10. The debris collection device for cutting mechanism of claim 9, wherein said debris collection bin is removably arranged on said separation cavity.

11. A debris collection device for cutting mechanism, comprising: a debris collection cap and a suction spray head used for connecting with a suction device; said debris collection cap comprises a connecting part used for surrounding and fixing on said cutting mechanism, and said debris collection cap is provided with a through hole communicated with said suction spray head, wherein said debris collection device for cutting mechanism also comprises a debris adsorption tube capable of adsorbing debris, and said suction spray head is connected with said suction device through said debris adsorption tube, wherein the connecting part of said debris collection cap is provided with a regulator used for regulating fixed position on said cutting mechanism.

\* \* \* \* \*